D. D. GORDON.
BUFFER.
APPLICATION FILED JUNE 28, 1910.
1,072,847.
Patented Sept. 9, 1913.
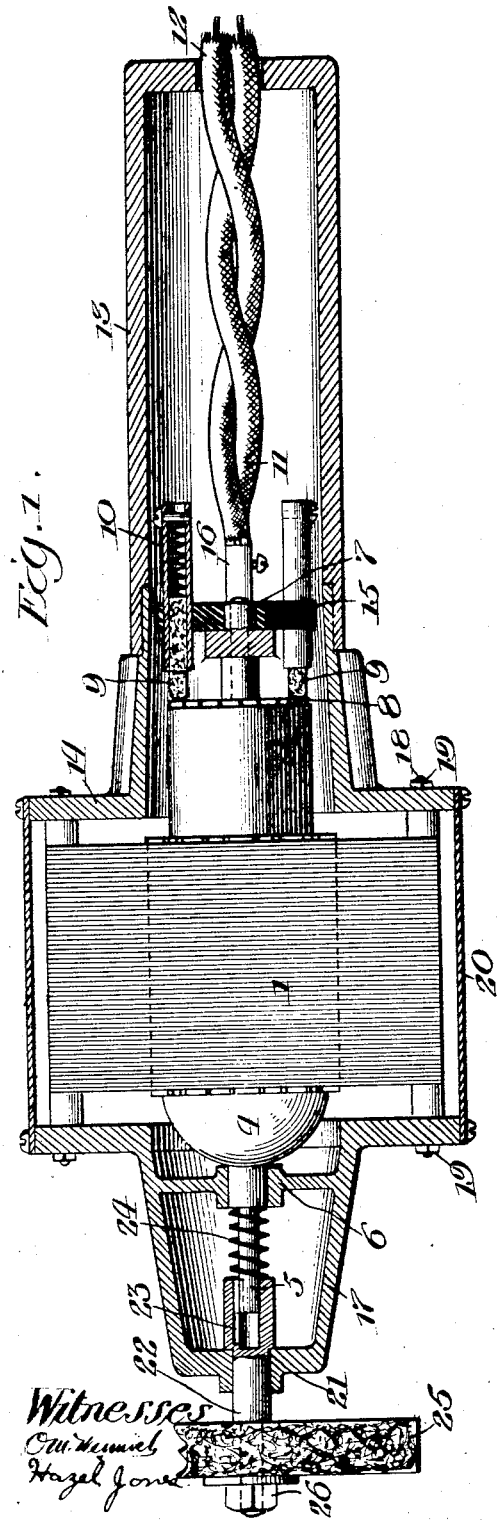
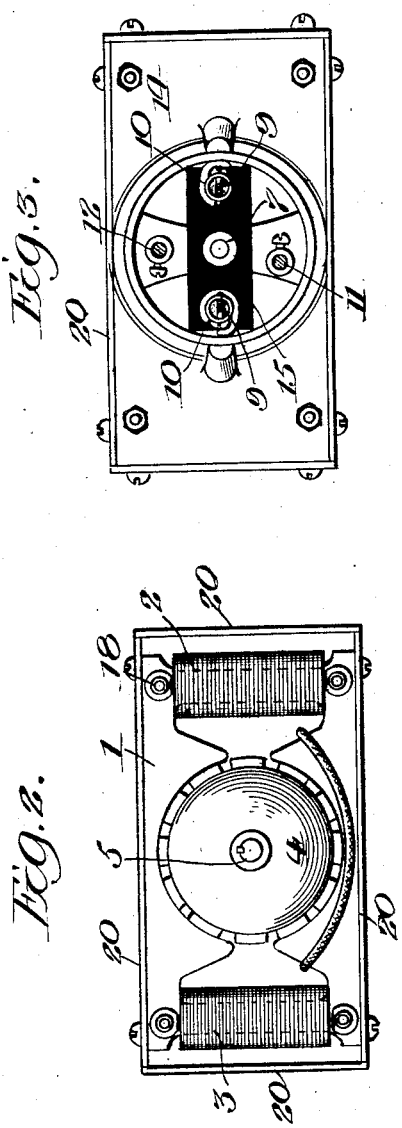
Witnesses
Inventor
David D. Gordon
by May W. Label
Atty.

UNITED STATES PATENT OFFICE.

DAVID D. GORDON, OF CHICAGO, ILLINOIS, ASSIGNOR OF ONE-HALF TO RELIABLE ELECTRIC COMPANY, OF CHICAGO, ILLINOIS, A CORPORATION OF ILLINOIS.

BUFFER.

1,072,847. Specification of Letters Patent. Patented Sept. 9, 1913.

Application filed June 28, 1910. Serial No. 569,264.

*To all whom it may concern:*

Be it known that I, DAVID D. GORDON, a subject of the Emperor of Germany, residing at Chicago, in the county of Cook and State of Illinois, have invented a certain new and useful Improvement in Buffers, of which the following is a full, clear, concise, and exact description, reference being had to the accompanying drawings, forming a part of this specification.

My invention relates to buffers, and has for its object the provision of an improved, portable buffing device which can be used on the work bench and whose portable features make it available for a great many uses such as an automobile where buffers of the ordinary type have been found inapplicable.

My invention contemplates a motor having a suitable handle attached thereto by means of which it can be held, and which handle at the same time serves for leading in the connecting cord devices to supply current to the motor. At the opposite extremity of the motor a suitable support is provided, within which a shaft is mounted which carries the buffer, and interposed between this buffer and the rigid shaft of the motor is a flexible device which furnishes the necessary elasticity and resilience so that the buffer in its operation can adjust itself to the material upon which it is working.

I will describe my invention more in detail by reference to the accompanying drawings illustrating the preferred embodiment thereof, in which,—

Figure 1 is a longitudinal, sectional view of my improved portable buffer; Fig. 2 is a detail view of the motor; and Fig. 3 is an end view with the handle removed, showing the brush connecting and electrical connecting devices.

Referring to the figures, I show a motor having a field structure 1 of suitable laminations, which field structure is provided with operating coils 2, 3, which coils are connected in series with a rotatably mounted armature 4. The armature shaft 5 is journaled in bearings 6 and 7. A commutator 8 is provided for the motor, which, in connection with the brushes 9, 9 held in place by suitable springs 10, furnishes current to the motor through the agency of the flexible cord 11 adapted to pass out through the hole 12 in the handle 13. The field structure of the motor carries an end plate 14 to which the handle is attached, and this end plate likewise carries the journal 7, and also a plate 15 mounted thereon, which carries the two brushes and binding posts 16, 16. The flexible cord 11 is connected to these binding posts 16. A second end plate 17 is also supported by the field structure 1, all through the agency of the bolts 18 and the nuts 19. Inclosing plates 20 are provided to form a homogeneous exterior for the motor portion of the device. The end plate 17 carries the journal 6 which supports the motor shaft, and also has a bearing 21 which supports the buffing shaft 22. The buffer shaft is mounted by means of a key 23 upon the armature shaft 5, a spring 24 being interposed to push the shaft 22 outwardly, as will be apparent. The shaft 22 is thereby permitted to be pushed inwardly when in operation by extra pressure exerted when the tool is in operation. A buffing wheel 25 is mounted on the shaft 22 through the agency of the nut 26, which buffing wheel may be of any desired characteristics to accomplish the work for which it is intended.

It will be seen from the construction thus described that I have provided a portable, yielding buffing device whose simplicity makes it applicable for use on small pieces of work, and which is so constructed that the parts thereof are rigidly secured together so as to render them less likely to become disarranged. The yielding connection between the buffing shaft and the motor shaft is of great importance, not only to permit the buffing wheel 25 to accommodate itself to the work, but also to prevent jars against the motor, and thus to keep it properly operating.

While I have herein shown and particularly described the preferred embodiment of my invention, I do not limit myself to the precise construction and arrangement as herein set forth; but

Having thus described its most salient features, what I claim as new and desire to secure by Letters Patent is:

1. A portable device of the character described comprising a motor having a laminated field structure and an armature, bolts to lock the laminations together, end plates forming part of a motor casing carried by said bolts, bearings in said end plates to support said armature, side walls to complete said casing carried by said end plates, a handle mounted upon one end plate aforesaid, an insulating bridge carried by said end plate, brushes carried by said bridge, terminals carried by said bridge, and flexible connections for said terminals leading out through said handle.

2. A portable device of the character described comprising a motor having a laminated field structure and an armature, bolts to lock the laminations together, end plates forming part of a motor casing carried by said bolts, bearings in said end plates to support said armature, side walls to complete said casing carried by said end plates, a handle mounted upon one end plate aforesaid, an insulating bridge carried by said end plate, brushes carried by said bridge, means carried by said bridge adapted to thrust said brushes longitudinally of said handle, terminals carried by said bridge, and flexible connections for said terminals leading out through said handle.

In witness whereof, I hereunto subscribe my name this 20th day of June, A. D. 1910.

DAVID D. GORDON.

Witnesses:
  HAZEL JONES,
  A. LYDA JONES.